United States Patent
Huggett (10) Patent No.: US 7,552,155 B2
(45) Date of Patent: Jun. 23, 2009

(54) APPARATUS AND METHOD TO FIND THE MAXIMUM OR MINIMUM OF A SET OF NUMBERS

(75) Inventor: Anthony Huggett, Southampton (GB)

(73) Assignee: Ericsson AB (SE)

( * ) Notice: Subject to any disclaimer, the term of this patent is extended or adjusted under 35 U.S.C. 154(b) by 285 days.

(21) Appl. No.: 11/588,733

(22) Filed: Oct. 27, 2006

(65) Prior Publication Data
US 2007/0118580 A1    May 24, 2007

(30) Foreign Application Priority Data
Oct. 28, 2005    (GB) ................................. 0522084.3

(51) Int. Cl.
*G06F 7/00* (2006.01)
*G06F 15/00* (2006.01)
(52) U.S. Cl. ........................................ 708/207; 708/200
(58) Field of Classification Search .............. 463/1; 708/207
See application file for complete search history.

(56) References Cited
U.S. PATENT DOCUMENTS

| | | | | |
|---|---|---|---|---|
| 4,651,301 A | * | 3/1987 | Ballmer et al. | 712/300 |
| 4,734,876 A | * | 3/1988 | Williams | 708/207 |
| 4,967,349 A | * | 10/1990 | Kodama et al. | 708/207 |
| 5,072,418 A | * | 12/1991 | Boutaud et al. | 708/207 |
| 5,515,306 A | * | 5/1996 | Blaner et al. | 708/207 |
| 5,726,923 A | * | 3/1998 | Okumura et al. | 708/207 |
| 5,894,426 A | * | 4/1999 | Ju | 708/207 |
| 6,470,440 B1 | * | 10/2002 | Nguyen et al. | 712/7 |
| 6,748,405 B2 | * | 6/2004 | de Tremiolles et al. | 708/207 |
| 2004/0117416 A1 | * | 6/2004 | Andreev et al. | 708/207 |

FOREIGN PATENT DOCUMENTS

RU    1087476    4/1993

* cited by examiner

*Primary Examiner*—John M Hotaling
*Assistant Examiner*—Werner Garner
(74) *Attorney, Agent, or Firm*—Seyfarth Shaw LLP (57) ABSTRACT

An apparatus for determining a best number, representing a maximum or minimum of a set of numbers, includes a first comparator 3 having a latency of at least one clock cycle to compare a current number with a current best score and to output a corresponding first comparator signal 7 and at least a second comparator 13 having a latency of at least one clock cycle to compare the current number with any other input number compared with a current best number while the current number was being processed through the apparatus and to output at least a corresponding second comparator signal 18. A combinatorial logic block 15 receives the comparator signals and outputs a corresponding signal 20 dependent thereon and on a flag signal 21 received from flagging means arranged to flag whether the current best number was updated for one or more preceding input numbers while the current number was being processed. A switch 6 outputs either the current best number, or the current number, as a new current best number, dependent upon the combinatorial logic block signal. A resultant reduction in logic steps processed in each clock cycle permits an increased clock frequency compared with the prior art.

22 Claims, 5 Drawing Sheets

APPARATUS AND METHOD TO FIND THE MAXIMUM OR MINIMUM OF A SET OF NUMBERS

FIELD OF INVENTION

This invention relates to an apparatus and method to find the maximum or minimum of a set of numbers.

BACKGROUND TO THE INVENTION

It is often the case that it is desired to find the maximum or minimum of a set of numbers or scores. For minimisation this operation may be described as:

if (score<lowest_score) then lowest_score=score.

or for maximisation if (score>highest_score) then highest_score=score.

Figure 1:
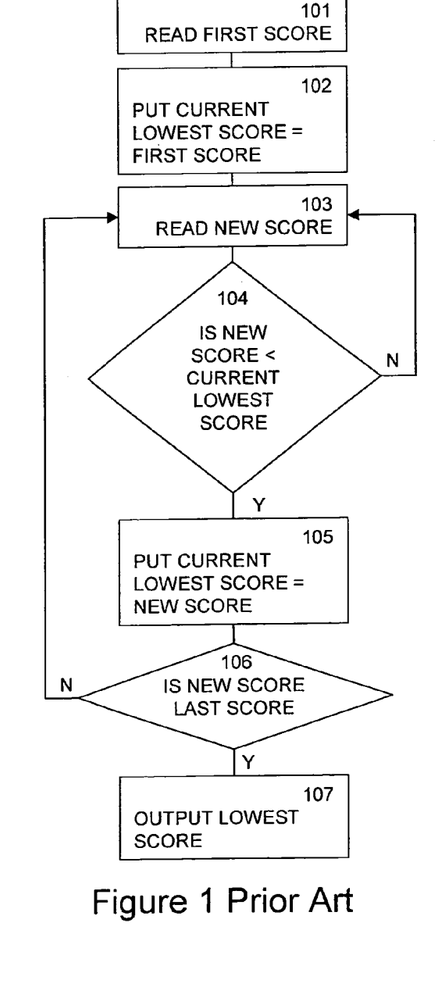
FIG. 1 is a flowchart of a known process of finding a best score.

That is, referring to FIG. 1, for minimisation, a new score is read, 103 and compared, 104, with a current lowest score. If the new score is less than the current lowest score the current lowest score is put, 105, equal to the new score. Similarly, for maximisation, if the new score is greater than the current highest score the current highest score is put equal to the new score.

Successive values of score may be presented such that lowest_score eventually contains the lowest score of all the values of score presented.

Lowest_score must first be initialised 101, 102, either to the highest possible score, if known, or the first value of score, as illustrated in FIG. 1. Highest score must first be initialised either to the lowest possible score, if known, or the first value of score.

In the following discussion a minimisation or maximisation operation is described in terms of finding a best score, where "best" may mean either minimum or maximum.

Figure 2:
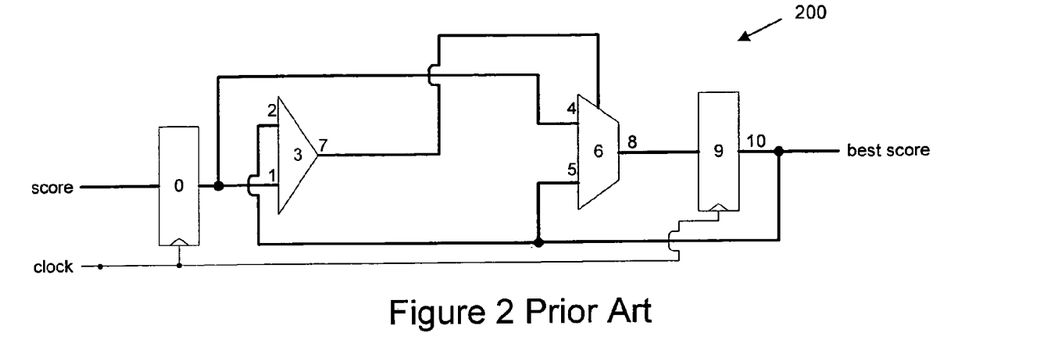
FIG. 2 is a logic diagram of a known apparatus for performing the process of FIG. 1.
Figure 3:
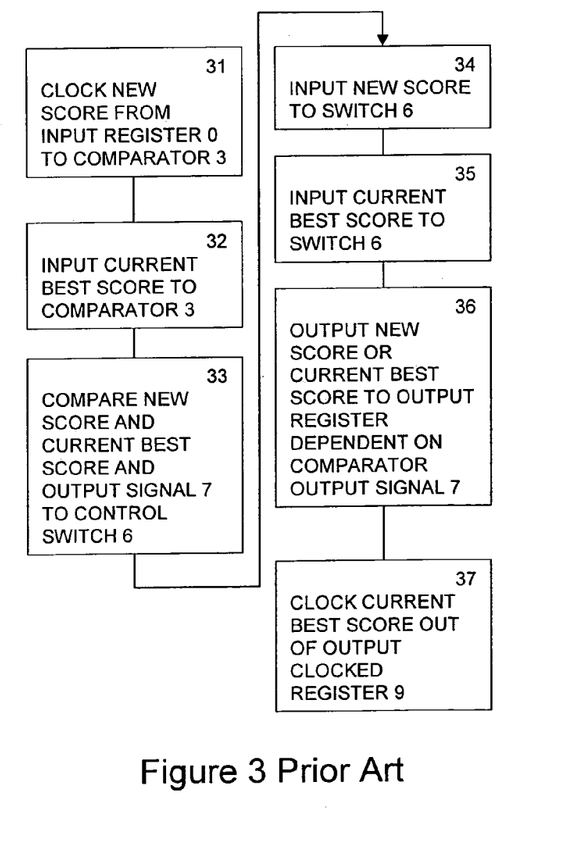
FIG. 3 is an illustration of method steps of the apparatus of FIG. 1.

Referring to FIGS. 2 and 3, a known hardware circuit 200 for calculating a best score is illustrated. Initial reset conditions are not shown.

An input register 0 has an input for a current score and has an output to a first input 1 of a comparator 3 and to a first input 4 of a switch 6. A current best score may be input to a second input 2 of the comparator 3 and to second input 5 of the switch 6. An output of the comparator 3 is connected to a control input of the switch 6. An output of the switch 6 is connected to an input of an output register 9. An output 10 of the output register 9 is a new current best score.

The input register 0 and the output register 9 are clocked by a common clock signal.

Referring to FIGS. 2 and 3, in use, a new score, represented as a multi-bit binary number, coming from the input register 0 is presented, step 31, to the first input 1 of the comparator 3, and simultaneously, step 34, to the first input 4 of the switch 6. The current best score is presented, step 32, to the second input 2 of the comparator 3 and presented, step 35, to the second input 5 of the switch 6. The switch 6 outputs, step 36, either the new score at the first input 4 or the best score at the second input 5 as a switch output 8 according to a comparison, step 33, by the comparator 3 of the new score and the current best score resulting in an output 7 of the comparator 3. It will be understood by those skilled in the art, that the comparator 3 may comprise a subtraction circuit. In this case, the output 7 of the comparator is the sign of the result, that is, the value of the most significant bit. On a rising edge of the clock signal, the output register 9 transfers, step 37, its input 8 as an output 10, creating a new current best score. Another new score may be presented to the circuit on every clock cycle.

Figure 4:
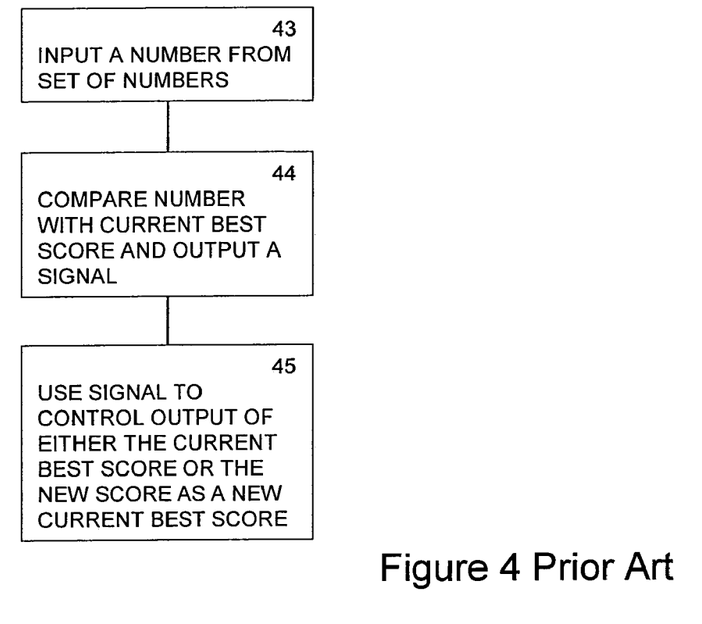
FIG. 4 is an illustration of a generalisation of the method of FIG. 3.

More generally, referring to FIG. 4, the known method comprises the steps of inputting, step 43, a number from a set of numbers; comparing, step 44, the input number with a current best score and outputting a corresponding signal; and using the signal to control, step 45, output of either the current best score or the number as a new current best score.

Referring to FIG. 2, the clock speed of this logic circuit is limited by a number of levels of logic between the output of the input register 0 and the input of the output register 9, and also, since there is feedback, between the output of the output register 9 and the input of output register 9, through the comparator 3 and the switch 6.

It is an object of the present invention at least to ameliorate the aforesaid deficiency in the prior art by seeking to increase the potential clock speed by reducing a number of levels of logic between registers.

SUMMARY OF THE INVENTION

According to the invention, there is provided an apparatus for determining a best number, representing a maximum or minimum of a set of numbers, comprising: first comparator means, having a latency of at least one clock cycle, arranged to compare a current number with a current best score and to output a corresponding first comparator signal; at least second comparator means having a latency of at least one clock cycle arranged to compare the current number with at least one other input number compared with a current best number while the current number is being processed through the apparatus and to output at least a corresponding second comparator signal; combinatorial logic means arranged to receive the comparator signals and to output a corresponding signal dependent thereon and on a flag signal received from flagging means arranged to flag whether the current best number was updated for one or more preceding input numbers while the current number was being processed; and switching means arranged to output either the current best number, or the current number, as a new current best number, dependent upon the combinatorial logic block signal.

Conveniently, the apparatus comprises: clocked input means arranged to input a current number serially from the set of numbers; wherein the first comparator means having a latency of at least one clock cycle is arranged to receive the current number from the input means; wherein the at least second comparator means comprises second comparator means having a latency of at least one clock cycle arranged to compare the current number with an input number preceding the current number by one and to output a corresponding second comparator signal; and wherein the combinatorial logic means is arranged to receive the first and second comparator signals and to output a corresponding combinatorial logic means signal dependent thereon and on a flag signal received from flagging means arranged to flag whether the current best score was updated for the input number preceding the current number by one.

Advantageously, the input means comprises a clocked register.

Conveniently, the apparatus comprises clocked storage means for storing the number preceding the current number by one.

Conveniently, the first comparator means having a latency of at least one clock cycle comprises a first comparator and first storage means for storing an output of the first comparator.

Conveniently, the at least a second comparator means having a latency of at least one clock cycle comprises a second comparator and second storage means for storing an output of the second comparator.

Advantageously, the flagging means comprises feedback storage means arranged to feedback to the combinatorial logic means an output of the combinatorial logic means for the input number preceding the current number by one.

Advantageously, the apparatus further comprises output storage means arranged to store an output of the switching means for one clock cycle.

Advantageously, the combinatorial logic means is arranged to determine whether the current number or the current best number is output as a new best number dependent upon the best of any previous number which has been compared with a current best number since the current number was read, the current number and the current best number.

Advantageously, the first and second comparator means have a latency of at least two clock cycles, and the apparatus further comprises: third comparator means, having a latency of at least two cycles, arranged to compare the current number with an input number preceding the input number by two and to output a corresponding third comparator signal, further flagging means arranged to flag whether the current best score was updated for the input number preceding the current input number by two; wherein the combinatorial logic means is arranged to receive the first, second and third comparator signals and first and second flag signals indicating whether the current best score was updated for the two immediately preceding input numbers respectively and to output a corresponding combinatorial logic means signal; and wherein the switching means is arranged to receive the combinatorial logic means signal and to output either the current best score or the current number as a new current best score. Alternatively, the apparatus further comprises: third comparator means, having a latency of at least one cycle, arranged to compare the current number with an input number preceding the current number by two and to output a corresponding third comparator signal, further flagging means arranged to flag whether the current best score was updated for the input number preceding the current number by two; wherein the combinatorial logic means has a latency of at least one cycle and is arranged to receive the first, second and third comparator signals and first and second flag signal indicating whether the current best score was updated for the two immediately preceding input numbers respectively and to output a corresponding combinatorial logic means signal; and wherein the switching means is arranged to receive the combinatorial logic means signal and to output either the current best score or the number preceding the current number by two as a new current best score.

According to a second aspect of the invention, there is provided a method of determining a best number, representing a maximum or minimum of a set of numbers, comprising the steps of: comparing a current number with a current best score and outputting a corresponding first comparator signal using first comparator means, having a latency of at least one clock cycle; comparing the current number with at least one other input number compared with a current best number while the current number was being processed through the apparatus and outputting at least a corresponding second comparator signal using at least second comparator means having a latency of at least one clock cycle; receiving the comparator signals by combinatorial logic means and outputting a corresponding combinatorial logic means signal dependent thereon and on a flag signal received from flagging means arranged to flag whether the current best number was updated for one or more of the preceding input numbers while the current number was being processed; and outputting either the current best score, or the current number, from switching means as a new current best score, dependent upon the combinatorial logic means signal.

Conveniently, the method comprises the further step of inputting a current number serially from the set of numbers; wherein comparing the current number with at least one other input number comprises comparing the current number with an input number preceding the current number by one and outputting a corresponding second comparator signal using second comparator means having a latency of at least one clock cycle; wherein receiving the comparator signals comprises receiving the first and second comparator signals at combinatorial logic means and outputting a corresponding combinatorial logic means signal dependent thereon and on a flag signal received from flagging means flagging whether the current best score was updated for the input number preceding the current input number by one.

Conveniently, inputting a current number comprises inputting the current number from first clocked storage means.

Conveniently, the method comprises storing a number preceding the current input number by one in second clocked storage means.

Advantageously, comparing the current number with a current best score comprises comparing with first comparator means having a latency of at least one clock cycle and storing an output thereof in first storage means.

Advantageously, comparing the current number with an input number preceding the current number by one comprises comparing with second comparator means having a latency of at least one clock cycle and storing an output of the second comparator means in second storage means.

Advantageously, flagging whether the current best score was updated for the input number preceding the current input number by one comprises updating feedback storage means.

Advantageously, outputting either the current best score, or the current number comprises storing an output of the switching means in output storage means for one clock cycle.

Advantageously, outputting a corresponding combinatorial logic means signal comprises determining whether the current number or the current best number is output as a new best number dependent upon the best of any previous number which has been compared with a current best number since the current number was read, the current number and the current best number.

Conveniently, comparing the current number with a current best score comprises using first comparator means have a latency of at least two clock cycles, and comparing the current number with an input number preceding the current number by one comprises using second comparator means have a latency of at least two clock cycles, the method further comprising: comparing the current number with an input number preceding the current number by two using third comparator means having a latency of at least two clock cycle and outputting a corresponding third comparator signal; flagging whether the current best score was updated for the input number preceding the current input number by two; receiving the first, second and third comparator signals at combinatorial logic means and outputting a corresponding combinatorial logic means signal dependent thereon and on first and second flag signal indicating whether the current best score was updated for the two immediately preceding input numbers respectively and outputting a corresponding combinatorial logic means signal; and receiving the combinatorial logic means signal by switching means and outputting either the current best score or the current number as a new current best score.

Alternatively, the method further comprises: comparing the current number with an input number preceding the current number by two using third comparator means having a latency of at least two clock cycles and outputting a corresponding third comparator signal third comparator means; flagging whether the current best score was updated for the input number preceding the current input number by two; receiving the first, second and third comparator signals at combinatorial logic means having latency of at least one cycle and outputting a corresponding combinatorial logic means signal dependent thereon and on first and second flag signals indicating whether the current best score was updated for the two immediately preceding input numbers respectively and outputting a corresponding combinatorial logic means signal; and receiving the combinatorial logic means signal by switching means and outputting either the current best score or the input number preceding the current number by two as a new current best score.

BRIEF DESCRIPTION OF THE DRAWINGS

The invention will now be described, by way of example, with reference to the accompanying drawings in which.

In the Figures, like reference numerals denote like parts.

DETAILED DESCRIPTION OF EMBODIMENTS

Figure 5:
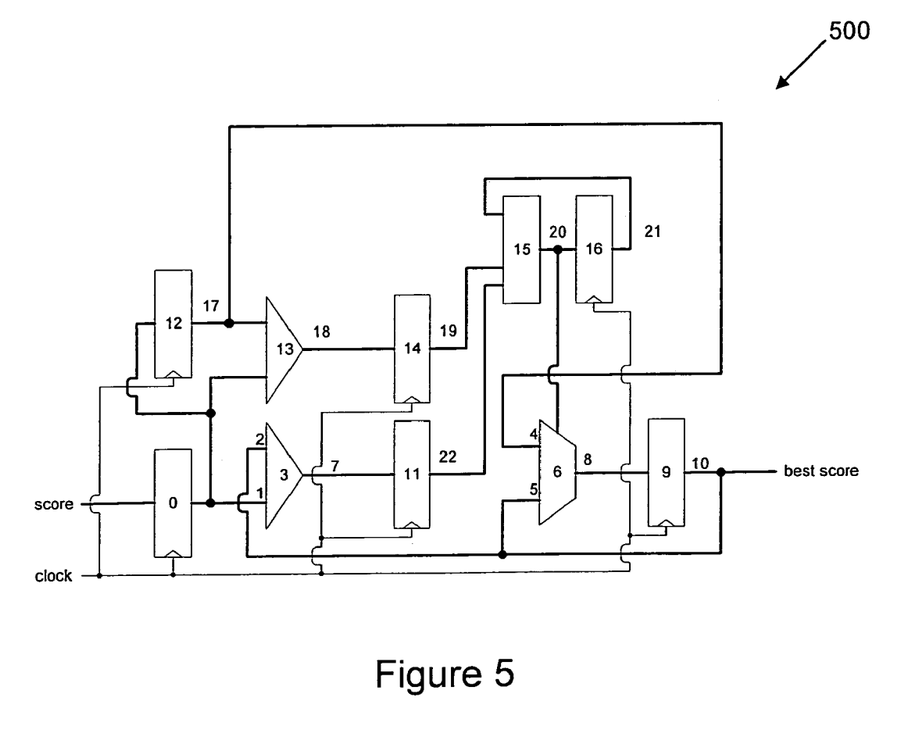
FIG. 5 is a logic diagram of first embodiment of an apparatus according to the invention.

Referring to FIG. 5, in a first embodiment of the invention, an apparatus 500 includes a first input register 0 having an input for a current score and an output to: a first input 1 of a comparator 3; an input of a second input register 12; and to a first input of a second comparator 13. The second input register 12 has an output to a second input of the second comparator 13 and to a first input 4 of a switch 6. A current best score may be input to a second input 2 of the comparator 3 and to a second input 5 of the switch 6. An output of the comparator 3 is connected to an input of a first intermediate register 11 and an output of the second comparator 13 is connected to an input of a second intermediate register 14. An output of the first intermediate register 11 and an output of the second intermediate register 14 are connected separately to first and second inputs of a combinatorial logic block 15. An output of the combinatorial logic block 15 is connected to a control input of the switch 6 and to an input of a feedback register 16 which has an output to a third input of the combinatorial logic block 15. An output of the switch 6 is connected to an input of an output register 9. An output 10 of the output register 9 becomes a new current best score.

All the registers 0, 9, 11, 12, 14 and 16 are clocked by a common clock signal.

Figure 6:
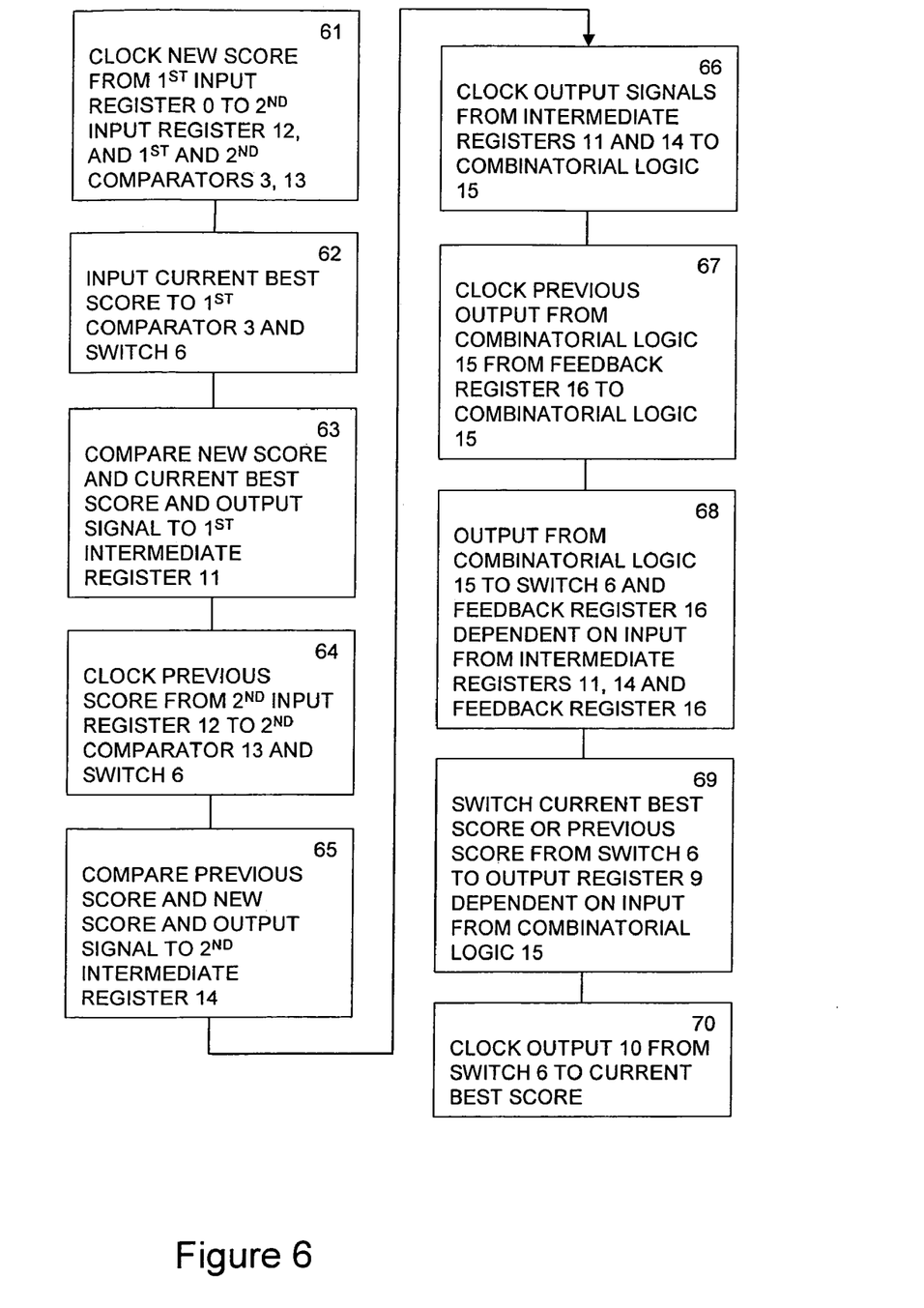
FIG. 6 is an illustration of method steps of the apparatus of FIG. 5.

Referring to FIGS. 5 and 6, in use a new score is sourced, step 61, from the register 0 and presented to the first input 1 of the first comparator 3. The current best score is presented, step 62, to the second input 2 of the first comparator 3. A result 7 of a comparison, step 63, by the first comparator 3 of the new score and the current best score is output from the comparator 3 and forms an input of the first intermediate register 11. This result 7 is transferred to form an output 22 of the first intermediate register 11 on a rising edge of the clock. Effectively the first comparator 3 and first intermediate register 11 form a pipelined comparator having a latency of one clock cycle. It will be understood by those skilled in the art that there are further ways to arrange the logic of the first comparator 3 and first intermediate register 11 in order to achieve a latency of one clock cycle for the combined process. For example, it may be more convenient to register the comparison part way through its computation, so that part of the first comparator 3 in fact lies after the first intermediate register 11. This technique of register balancing is well known in the art. The output 22 of the first pipelined comparator 3, 11 is input, step 66, to the first input of combinatorial logic block 15, and an output 20 of combinatorial logic block 15 is passed, step 68, to combinatorial logic block register 16 and to the control input of the switch 6. The current best score is input, step 62, to the first input 5 of switch 6 and a delayed input score 17, input into the apparatus immediately previously to the current score, from the second input register 12, is input, step 64, to the first input 4 of the switch 6.

The current input score is also input, step 64, to a first input of the second comparator 13 and the delayed, or previous, input score 17 is compared, step 65, to the current input score in a second pipelined comparator 13, 14, illustrated as comprising the second comparator 13 with an output 18 driving the input of a second intermediate register 14. An output 19 of this pipelined comparator 13, 14 is input, step 66, to the second input to the combinatorial logic means 15. An output 20 of combinatorial logic block 15 is delayed in feedback register 16 and an output 21 of the feedback register 16 is input, step 67, to a third input of the combinatorial logic block 15.

Following an edge on the clock, it will be understood that the output 17 of second input register 12 is the new score. Signal 22 at the output of the first intermediate register 11 is the result, for example, sign, of a comparison between the new score and the best score when new score was input, and signal 19 at the output of the second intermediate register 14 is the result of a comparison of the new score with the previous new score. However, it may be that the best score 10 has now been updated with the previous score. Combinatorial logic means 15 takes the registered results 19, 22 of the two comparisons, and selects the operation of the switch 6 dependent on whether or not the best score was updated last cycle, producing an update signal 20. If the best score was updated with the previous score on the last cycle, then the delayed update signal 21 causes the logic of combinatorial block 15 to allow an update of the best score if and only if the score is better than the previous score i.e. the output 19 of the second intermediate register 14. Otherwise the update is allowed according to the result of the comparison with the best score, i.e. the output 22 of first intermediate register 11.

The operation of combinatorial logic means 15 is defined as follows:

Truth Table for the Combinatorial Logic Block 15 of FIG. 5.

| Input 21 | Input 19 | Input 22 | Output 20 |
|---|---|---|---|
| 0 | — | 0 | 0 |
| 0 | — | 1 | 1 |
| 1 | 0 | — | 0 |
| 1 | 1 | — | 1 |

Where
'1' means active,
'0' means inactive and
'—' is don't care.

In other words, if the best score has not just been updated, i.e. Input 21=0, then the result, Input 22, of comparing the best score with the new score is used as Output 20. If the best score has just been updated, i.e. Input 21=1, then clearly the previous new score was better than the previous best score, so the result, Input 19, of the comparison of new score with the previous new score is used as the Output 20.

Thus, feedback from the feedback register flags whether the best score was updated by an immediately preceding number or score. It will be understood that other known means of maintaining such a flag may be used.

It will be clear to those skilled in the art that the latency of this design has been increased from one clock cycle in the prior art to two clock cycles, and that there are less levels of logic between registers in the apparatus 500 compared with the prior art apparatus 200 described herein, allowing a higher clock speed.

However, it may be that a required clock speed cannot be achieved by simply one extra stage of pipelining as described, although it is known that the process of subtraction may itself be pipelined, effectively increasing the latency of the described apparatus to three, or more, clock cycles. If still further increases in clock speed are required, further stages, comparing the new score with those which were input two or more clock cycles previously may be added, at the expense of increasing complexity in the logic of combinatorial block 15.

Figure 7:
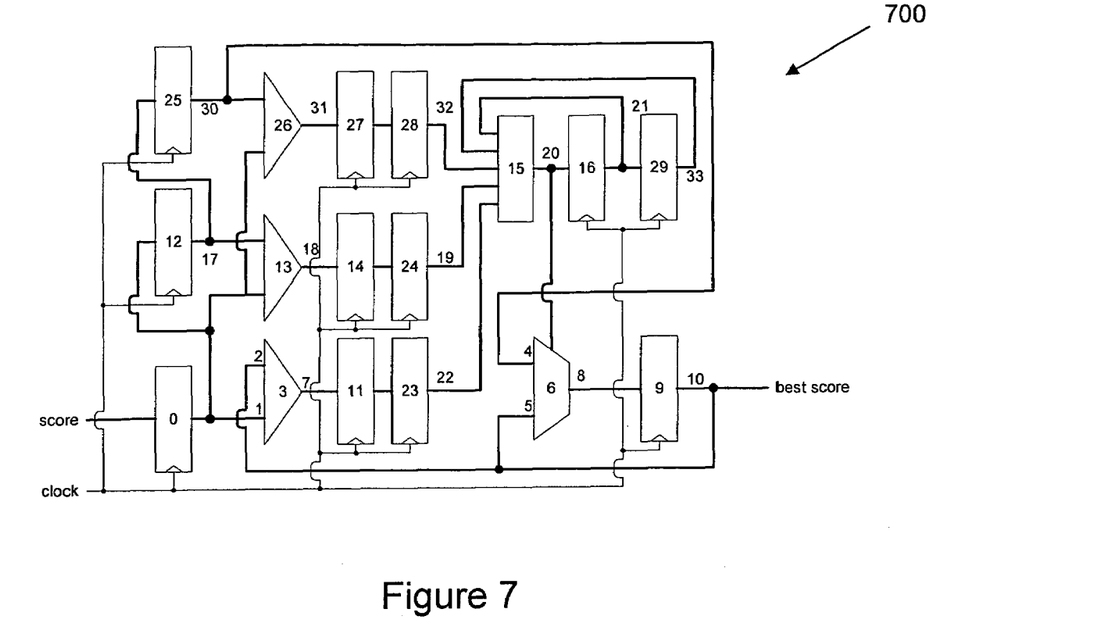
FIG. 7 is a logic diagram of second embodiment of an apparatus according to the invention.
Figure 8:
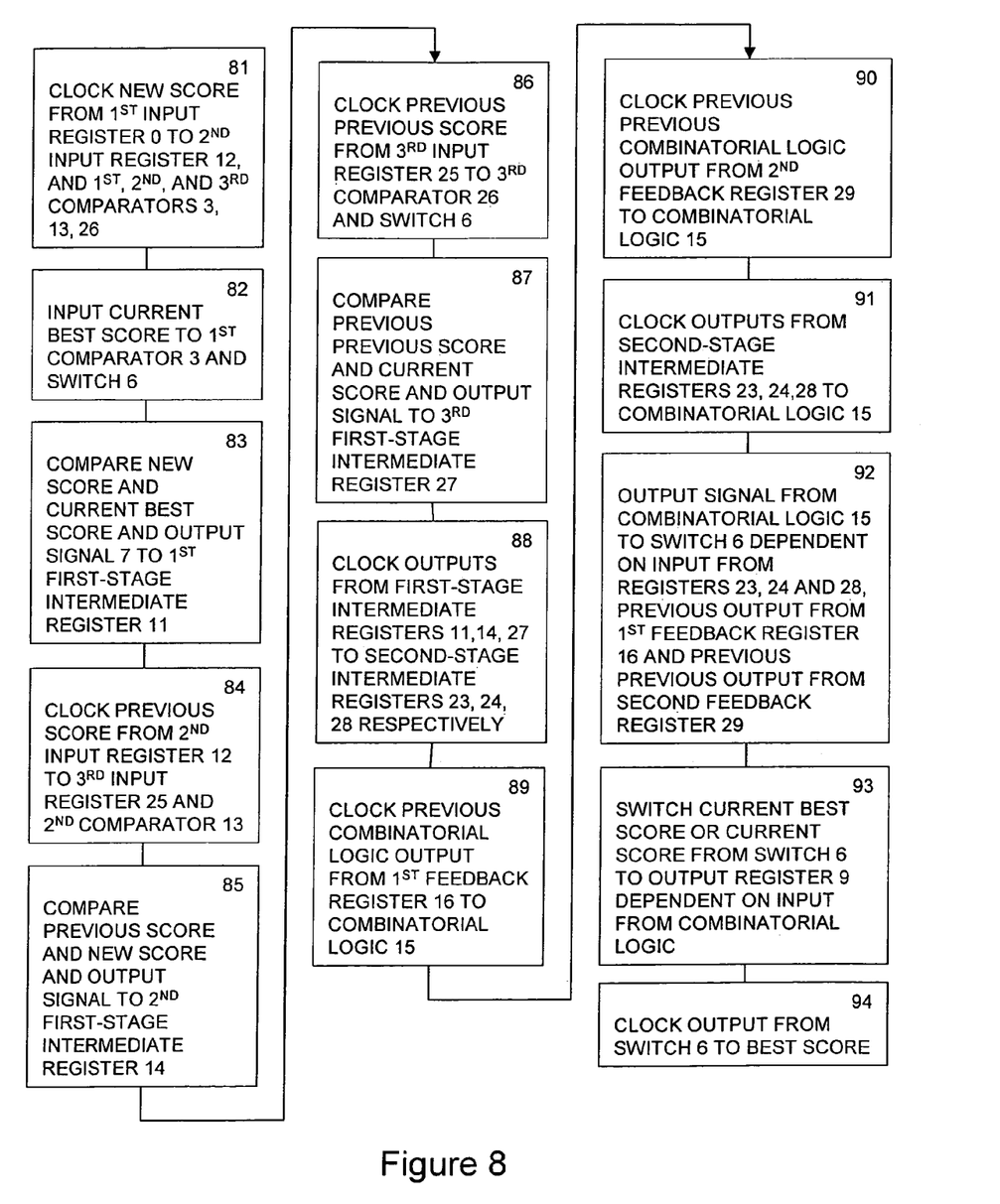
FIG. 8 is an illustration of method steps of the apparatus of FIG. 7.

It is then necessary to take two or more previous decisions into account, as shown in the apparatus of a second embodiment of the invention in FIGS. 7 and 8.

In the apparatus 700 of FIG. 7, a first comparator 3 and first- and second-stage intermediate registers 11, 23 together represent a pipelined comparator with a latency of two clock cycles.

In detail, in a second embodiment of the invention, an apparatus 700 includes a first input register 0, with an input for a current score and an output to: a first input 1 of a first comparator 3; an input of a second input register 12; to a first input of a second comparator 13; and to a first input of a third comparator 26. The second input register 12 has an output 17 to a second input of the second comparator 13 and to an input of a third input register 25. The third input register 25 has an output 30 to a second input of the third comparator 26 and to a first input 4 of a switch 6.

An output of the comparator 3 is connected to an input of a first first-stage intermediate register 11, an output of the second comparator 13 is connected to an input of a second first-stage intermediate register 14 and an output of the third comparator 26 is connected to an input of a third first-stage intermediate register 27. Outputs of the first, second and third first-stage intermediate registers 11, 14, 27 are connected to inputs of first, second and third second-stage intermediate registers 23, 24, 28 respectively. An output of the first second-stage intermediate register 23, an output of the second second-stage intermediate register 24 and an output of the third second-stage intermediate register 28 are connected separately to first, second and third inputs of a combinatorial logic block 15.

An output of the combinatorial logic block 15 is connected to a control input of the switch 6 and to an input of a first feedback register 16 which has an output to a third input of the combinatorial logic block 15 and to an input of a second feedback register 29. The second feedback register 29 has an output to a fourth input of the combinatorial logic block 15.

A current best score may be input to a second input 2 of the comparator 3 and to a second input 5 of the switch 6. An output of the switch 6 is connected to an input of an output register 9. An output 10 of the output register 9 is output as the new current best score.

The registers 0, 9, 11, 12, 14, 16, 23-25, 27-29 are clocked by a common clock signal.

Referring to FIGS. 7 and 8, in use a new score is sourced, step 81, from the register 0 and presented to the first input 1 of the first comparator 3. The current best score is presented, step 82, to the second input 2 of the first comparator 3. A result 7 of a comparison, step 83, by the first comparator 3 of the new score and the current best score forms an input of the first first-stage intermediate register 11. This result 7 is transferred as an output of the first first-stage intermediate register 11 on a rising edge of the clock and input, step 88, to the first second-stage intermediate register 23. This result is transferred, step 91, as an output 22 of the first second-stage intermediate register 23 on a second rising edge of the clock. Effectively the first comparator 3, the first first-stage intermediate register 11 and the first second-stage intermediate register. 23 form a pipelined comparator having a latency of two clock cycles. It will be understood by those skilled in the art that there are various alternative possible arrangements of the logic of the first comparator 3, the first first-stage intermediate register 11 and first second-stage intermediate clock register 23 in order to achieve a latency of two clock cycles for the combined process. This technique of register balancing is well known in the art.

The output 22 of the pipelined comparator 3, 11, 23 is input, step 91, to the first input of combinatorial logic block 15, and the output 20 of combinatorial logic block 15 is passed, step 92, to the first combinatorial logic block register 16 and to the control input of the switch 6. A twice delayed input score 30, from the third input register 25, is input, step 86, to the first input 4 of the switch 6 and the current best score is input, step 82, to the second input 5 of switch 6.

The current input score is also input, step 81, to the first input of the second comparator 13 and the delayed input score 17, i.e. a score read into the apparatus immediately previously to the current input score, is compared, step 85, to the current input score 1 in a second pipelined comparator 13, 14, 24, shown as comprising the second comparator 13 with an output 18 driving the input of a second first-stage intermediate register 14 and a second second-stage intermediate register 24. The output 19 of this pipelined comparator 13, 14, 24 is input, step 91, to the second input to the combinatorial logic means 15.

The current input score is also input, step 81, to the first input of the third comparator 26 and the twice delayed input score 30, i.e. a score read into the apparatus immediately previously to the delayed input score 17, is compared, step 87, to the current input score in a third pipelined comparator 26, 27, 28, shown as comprising the third comparator 26 with an output 31 driving the input of a third first-stage intermediate register 27 and a third second-stage intermediate register 28.

The output 32 of this pipelined comparator 26, 27, 28 is input, step 91, to the third input to the combinatorial logic means 15.

The output 20 of combinatorial logic block 15 is delayed in the first feedback register 16 and an output 21 of the first feedback register 16 is input, step 89, to a fourth input of the combinatorial logic block 15.

The output 21 of first feedback register 16 is also delayed in the second feedback register 29 and an output 33 of the second feedback register 29 is input, step 90, to a fifth input to the combinatorial logic block 15.

Following an edge on the clock, it will be understood that the output 17 of second input register 12 now is the new score. The signal at the output of the first first-stage intermediate register 11 contains the result 7, for example the sign, of a comparison between the new score and the best score when new score was input, and the signal at the output of the second first-stage intermediate register 14 contains the result 18 of a comparison of the new score with the previous new score. Following a further edge on the clock, it will be understood that the output 30 of third input register 25 now contains the new score. Signal 22 at the output of the first second-stage intermediate register 23 is the result, for example the sign, of a comparison between the new score and the best score when new score was input, and signal 19 at the output of the second second-stage register 24 contains the result of a comparison of the new score with the previous new score. Signal 32 at the output of the third second-stage register 28 contains the result of a comparison of the new score with the score immediately previous to the previous score (hereinafter the previous previous score). However, it may be that the best score 10 has now been updated with the previous score or the score previous previous score. Combinatorial logic means 15 takes the registered results 32, 19, 22 of the three comparisons, and selects the operation of the switch 6 dependent on whether or not the best score was updated in the last two cycles, producing an update signal 20. If the best score was updated with the previous score or the previous previous score, then the delayed update signal 21 causes the logic of combinatorial block 15 to allow an update of the best score if and only if the score is better than the previous score and the previous previous score i.e. the output 19 of the second second-stage intermediate register 24 and the output 32 of the third second-stage intermediate register 28. Otherwise the update is allowed according to the result of the comparison with the best score, i.e. the output 22 of first second-stage intermediate register 23.

The logic of combinatorial block 15 is now as follows. If the previous score was used to update the best score, then the current best score is updated with the current score if and only if the current score is better than the previous score.

Otherwise, if the previous previous score was used to update the current best score, then the current best score is updated with the current score if and only if the current score is better than the previous previous score.

Otherwise, (i.e. if neither the previous nor the previous previous scores were used to update the current best score) the current best score is updated with the current score if the current score is better than the current best score.

Truth Table for FIG. 7, combinatorial block 15

| Input 33 | Input 21 | Input 32 | Input 19 | Input 22 | Output 20 |
|---|---|---|---|---|---|
| 1 | — | 0 | — | — | 0 |
| 1 | — | 1 | — | — | 1 |

-continued

Truth Table for FIG. 7, combinatorial block 15

| Input 33 | Input 21 | Input 32 | Input 19 | Input 22 | Output 20 |
|---|---|---|---|---|---|
| 0 | 1 | — | 0 | — | 0 |
| 0 | 1 | — | 1 | — | 1 |
| 0 | 0 | — | — | 0 | 0 |
| 0 | 0 | — | — | 1 | 1 |

In other words, if the best score was not updated with the previous previous score, i.e. Input 33=0 and if the best score has not just been updated by the previous score, i.e. Input 21=0, then the result, Input 22, of comparing the best score with the new score is used as Output 20. If the best score has just been updated, i.e. Input 21=1, then clearly the previous new score was better than the previous best score, so the result, Input 19, of the comparison of new score with the previous new score is used as the Output 20. If the best score was updated with the previous previous score, i.e. Input 33=1, then Input 32, a comparison of the current score with the previous previous score, is used as Output 20.

Generalisation to higher latencies will be apparent to persons skilled in the art.

Figure 9:
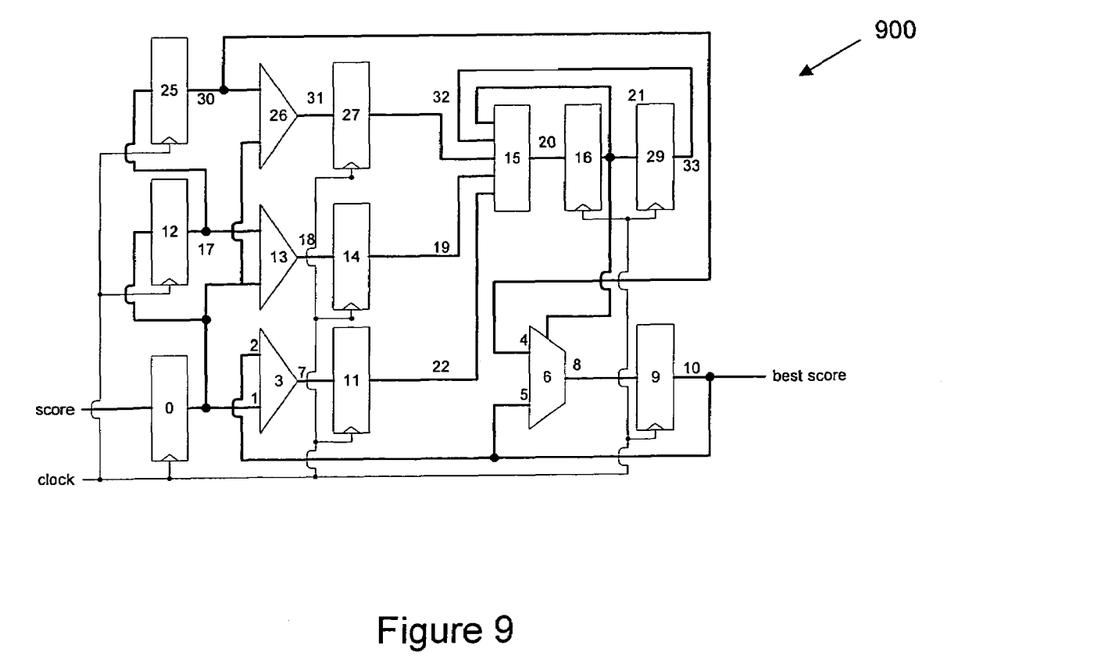
FIG. 9 is a logic diagram of third embodiment of an apparatus according to the invention.

FIG. 9 shows an apparatus 900 having an alternative two cycle latency implementation, in which the logic components are substantially the same as in embodiments 500, 700 previously described herein. However, in this embodiment, the adders 3, 11; 13, 14; 26, 27 have a latency of one clock cycle, but the switch 6 is driven by a signal 21 from a first feedback register 16, i.e. the output 20 of combinatorial logic block 15 is delayed by one clock cycle before application to a control input of switch 6. That is, the combinatorial logic block also has a latency of one clock cycle. The logic of combinatorial logic block 15 is as for the embodiment 700 illustrated in FIG. 7.

Although the present invention has been described with reference to preferred embodiments, workers skilled in the art will recognize that changes may be made in form and detail without departing from the spirit and scope of the invention.

We claim:

1. An apparatus for determining a best number, representing a maximum or minimum of a set of numbers, comprising:
   a) first comparator means, having a latency of at least one clock cycle, arranged to compare a current number with a current best score and to output a corresponding first comparator signal;
   b) at least second comparator means in parallel with the first comparator means and having a latency of at least one clock cycle arranged to compare the current number with a number input immediately previously while the current number is being processed through the apparatus and to output at least a corresponding second comparator signal;
   c) combinatorial logic means arranged to receive the comparator signals and to output a corresponding signal dependent thereon and on a flag signal received from flagging means arranged to flag whether the current best number was updated for one or more preceding input numbers while the current number was being processed; and
   d) switching means arranged to output either the current best number, or the current number, as a new current best number, dependent upon the combinatorial logic block signal.

2. An apparatus as claimed in claim 1 further comprising clocked input means arranged to input a current number serially from the set of numbers;
   a) wherein the first comparator means having a latency of at least one clock cycle is arranged to receive the current number from the input means;
   b) wherein the at least second comparator means comprises second comparator means having a latency of at least one clock cycle arranged to compare the current number with an input number preceding the current number by one and to output a corresponding second comparator signal; and
   c) wherein the combinatorial logic means is arranged to receive the first and second comparator signals and to output a corresponding combinatorial logic means signal dependent thereon and on a flag signal received from flagging means arranged to flag whether the current best score was updated for the input number preceding the current number by one.

3. An apparatus as claimed in claim 2, wherein the input means comprises a clocked register.

4. An apparatus as claimed in claim 1, comprising clocked storage means for storing the number preceding the current number by one.

5. An apparatus as claimed in claim 1, wherein the first comparator means having a latency of at least one clock cycle comprises a first comparator and first storage means for storing an output of the first comparator.

6. An apparatus as claimed in claim 1, wherein the at least second comparator means having a latency of at least one clock cycle comprises a second comparator and second storage means for storing an output of the second comparator.

7. An apparatus as claimed in claim 1, wherein the flagging means comprises feedback storage means arranged to feedback to the combinatorial logic means an output of the combinatorial logic means for the input number preceding the current number by one.

8. An apparatus as claimed claim 1, further comprising output storage means arranged to store an output of the switching means for one clock cycle.

9. An apparatus as claimed in claim 1, wherein the combinatorial logic means is arranged to determine whether the current number or the current best number is output as a new best number dependent upon the best of any previous number which has been compared with a current best number since the current number was read, the current number and the current best number.

10. An apparatus as claimed in claim 2, wherein the first and second comparator means have a latency of at least two clock cycles,
   the apparatus further comprising:
   third comparator means, in parallel with the first comparator means and having a latency of at least two cycles, arranged to compare the current number with an input number preceding the input number by two and to output a corresponding third comparator signal,
   further flagging means arranged to flag whether the current best score was updated for the input number preceding the current input number by two;
   wherein the combinatorial logic means is arranged to receive the first, second and third comparator signals and first and second flag signal indicating whether the current best score was updated for the two immediately preceding input numbers respectively and to output a corresponding combinatorial logic means signal; and
   wherein the switching means is arranged to receive the combinatorial logic means signal and to output either the current best score or the current number as a new current best score.

11. An apparatus as claimed in claim 2, further comprising:
   third comparator means, having a latency of at least one cycle, arranged to compare the current number with an input number preceding the current number by two and to output a corresponding third comparator signal,
   further flagging means arranged to flag whether the current best score was updated for the input number preceding the current number by two;
   wherein the combinatorial logic means has a latency of at least one cycle and is arranged to receive the first, second and third comparator signals and first and second flag signal indicating whether the current best score was updated for the two immediately preceding input numbers respectively and to output a corresponding combinatorial logic means signal; and
   wherein the switching means is arranged to receive the combinatorial logic means signal and to output either the current best score or the number preceding the current number by two as a new current best score.

12. A method of determining a best number, representing a maximum or minimum of a set of numbers, comprising:
   a) comparing a current number with a current best score and outputting a corresponding first comparator signal using first comparator means, having a latency of at least one clock cycle;
   b) comparing the current number with at least one other number input immediately previously while the current number was being processed through the apparatus and outputting at least a corresponding second comparator signal using at least second comparator means in parallel with the first comparator means and having a latency of at least one clock cycle;
   c) receiving the comparator signals by combinatorial logic means and outputting a corresponding combinatorial logic means signal dependent thereon and on a flag signal received from flagging means arranged to flag whether the current best number was updated for one or more of the preceding input numbers while the current number was being processed arranged to; and
   d) outputting either the current best score, or the current number, from switching means as a new current best score, dependent upon the combinatorial logic means signal.

13. A method as claimed in claim 12 comprising the further step of inputting a current number serially from the set of numbers;
   e) wherein comparing the current number with at least one other input number comprises comparing the current number with an input number preceding the current number by one and outputting a corresponding second comparator signal using second comparator means having a latency of at least one clock cycle; and
   f) wherein receiving the comparator signals comprises receiving the first and second comparator signals at combinatorial logic means and outputting a corresponding combinatorial logic means signal dependent thereon and on a flag signal received from flagging means flagging whether the current best score was updated for the input number preceding the current input number by one.

14. A method as claimed in claim 13, wherein inputting a current number comprises inputting the current number from first clocked storage means.

15. A method as claimed in claim 13, comprising storing a number preceding the current input number by one in second clocked storage means.

16. A method as claimed in claim 13, wherein comparing the current number with a current best score comprises comparing with first comparator means having a latency of at least one clock cycle and storing an output thereof in first storage means.

17. A method as claimed in claim 13, wherein comparing the current number with an input number preceding the current number by one comprises comparing with second comparator means having a latency of at least one clock cycle and storing an output of the second comparator means in second storage means.

18. A method as claimed in claim 13, wherein flagging whether the current best score was updated for the input number preceding the current input number by one comprises updating feedback storage means.

19. A method as claimed in claim 13, wherein outputting either the current best score, or the current number comprises storing an output of the switching means in output storage means for one clock cycle.

20. A method as claimed in claim 13, wherein outputting a corresponding combinatorial logic means signal comprises determining whether the current number or the current best number is output as a new best number dependent upon the best of any previous number which has been compared with a current best number since the current number was read, the current number and the current best number.

21. A method as claimed in claim 13, wherein comparing the current number with a current best score comprises using first comparator means have a latency of at least two clock cycles, and comparing the current number with an input number preceding the current number by one comprises using second comparator means have a latency of at least two clock cycles the method further comprising:
  comparing the current number with an input number preceding the current number by two using third comparator means in parallel with the first comparator means and having a latency of at least two clock cycle and outputting a corresponding third comparator signal from the third comparator means, flagging whether the current best score was updated for the input number preceding the current input number by two;

receiving the first, second and third comparator signals at combinatorial logic means and outputting a corresponding combinatorial logic means signal dependent thereon and on first and second flag signal indicating whether the current best score was updated for the two immediately preceding input numbers respectively and outputting a corresponding combinatorial logic means signal; and receiving the combinatorial logic means signal by switching means and outputting either the current best score or the input number preceding the current number by two as a new current best score.

22. A method as claimed in claim 13, further comprising:

comparing the current number with an input number preceding the current number by two using third comparator means in parallel with the first comparator means and having a latency of at least two clock cycles and outputting a corresponding third comparator signal;

flagging whether the current best score was updated for the input number preceding the current input number by two;

receiving the first, second and third comparator signals at combinatorial logic means having latency of at least one cycle and outputting a corresponding combinatorial logic means signal dependent thereon and on first and second flag signal indicating whether the current best score was updated for the two immediately preceding input numbers respectively and outputting a corresponding combinatorial logic means signal; and receiving the combinatorial logic means signal by switching means and outputting either the current best score or the current number as a new current best score.

\* \* \* \* \*